UNITED STATES PATENT OFFICE 2,554,072

ANTACID COMPOSITION

Miller J. Sullivan and Gustav J. Martin, Philadelphia, Pa., assignors to The National Drug Company, Philadelphia, Pa., a corporation of Pennsylvania No Drawing. Application October 4, 1948,
Serial No. 52,787

3 Claims. (Cl. 167—55)

This invention relates to a new composition particularly suitable for ulcer therapy or other disorders attributable to hyperacidity and related causes. More particularly, it is concerned with a composition wherein an anion exchange resin has adsorbed or absorbed thereon an antispasmodic such as atropine or homatropine.

It is an object of this invention to produce new theorapeutic compositions particularly adapted for ulcer therapy wherein the surprising effectiveness of certain anion exchange resins is further enhanced by adsorbing or absorbing thereon atropin sulfate or other antispasmodics. Additional objects will become apparent from a consideration of the following description and claims.

We have found that atropine sulfate or other antispasmodics are adsorbed or absorbed by anion exchange resins to produce compositions containing the antispasmodic in therapeutic dosages. We have further found that these compositions appear to have enhanced effectiveness over that obtained from treatment with the individual components.

In accordance with our invention certain anion exchange resins which are surprisingly effective in the treatment of ulcers and other disorders attributable to hyperacidity are mixed with an aqueous solution of atropine sulfate or other antispasmodics for a sufficient period of time to adsorb the desired therapeutic doses of the antispasmodic. This dosage is preferably 1 milligram of antispasmodic per gram of resin, although amounts from ¼ milligram to more than 20 milligrams per gram of resin may be produced if desired.

The anion exchange resins which are particularly adapted for this purpose are sold by The Resinous Products & Chemical Company of Philadelphia, Pennsylvania, under the trade name of "Amberlite." Resins of this type are described in U. S. Patent No. 2,402,384 as the condensation product of a phenol, formaldehyde and an alkylene polyamine, the alkylene group of which may be interrupted by —NH— to form alkylene chains of at least two carbon atoms between nitrogen atoms. Among these resins may be mentioned the anion exchange resinous condensation product of phenol, formaldehyde and a polyalkylene polyamine, preferably a polyethylene polyamine. The resins should be finely divided and are advisably of a sufficiently small particle size to pass through 100 mesh. For optimum results we have found that a particle size of less than 200 mesh is preferable.

While antispasmodics generally in their water soluble forms are contemplated for use, we prefer to use atropine sulfate or some other water soluble form of atropine.

The finely divided resin is mixed with an aqueous solution of atropine sulfate or related antispasmodics for a sufficient period to produce the desired concentration. The amount of antispasmodic adsorbed on the resin may readily be determined by analyzing the filtrate. We have found the iodometric method described by Thomas and Jotrides (J. Pharm. Chem. 21, 185 (1935)), to be well adapted for this purpose. By this method the original and final atropine sulfate content of the solution may be determined and from these determinations the amount adsorbed on the resin may be speedily calculated.

For ulcer therapy the amount of anion exchange resin may be varied widely depending upon the condition of the patient and the desires of the physician. Amounts of from 1 to 15 grams of resin per day may be used. As a general rule, it may be stated that two ¼ gram tablets every two hours while the patient is awake, produces excellent results. Bearing in mind the foregoing dosages it is possible to adsorb on the surface of the resin sufficient atropine to combine the required dosage of resin as well as antispasmodic. If the resin contains a higher concentration of antispasmodic than is desired, this may be cared for effectively by mixing it with resin having no antispasmodic adsorbed thereon or if desired by extending the resin-antispasmodic composition with any of the inert extenders commonly used in the preparation of capsules, tablets, etc.

As an example of the manner in which antispasmodic may be adsorbed on anion exchange resins, reference may be made to the following examples. In these examples there was employed 200 grams of the anion exchange resinous condensation product of phenol, formaldehyde and an alkylene polyamine, ground to a fineness of less than 100 mesh. One liter of an atropine sulfate aqueous solution containing 5.412 grams of atropine sulfate was employed.

| Contact Time, min. | Atropine Sulfate Adsorbed on Resin, mg./g. | Atropine Sulfate Remaining in Solution, g./l. | Per Cent Atropine Sulfate Remaining in Solution | Per Cent Atropine Sulfate Removed from Solution |
|---|---|---|---|---|
| 20 | 9.8 | 3.455 | 63.9 | 36.1 |
| 40 | 12.5 | 2.903 | 53.8 | 46.2 |
| 60 | 14.9 | 2.439 | 45.0 | 55.0 |

It is evident from the above that this invention adds another valuable therapeutic composition to those now available for the treatment of ulcers.

The composition is stable, easily administered and is most effective. By means of the antispasmodic content the surprisingly beneficial properties of the resin are further enhanced.

As many apparently widely different embodiments of this invention may be made without departing from the spirit and scope hereof, it is to be understood that the invention is not limited to the specific embodiments hereof except as defined in the appended claims.

We claim:

1. An antacid composition comprising atropine sulfate and a finely divided anion exchange resinous condensation product of phenol, formaldehyde and an alkylene polyamine.

2. An antacid composition comprising an anion exchange resinous condensation product of phenol, formaldehyde and a polyethylene polyamine, having a particle size smaller than 100 mesh and having adsorbed thereon atropine sulfate in an amount of more than ½ milligram of atropine sulfate per gram of resin.

3. An antacid composition comprising a finely divided anion-exchange resinous condensation product of a phenol, formaldehyde and an alkylene polyamide, in combination with a water-soluble salt of a member of the class consisting of atropine and homatropine.

MILLER J. SULLIVAN.
GUSTAV J. MARTIN.

REFERENCES CITED

The following references are of record in the file of this patent:

Gutman, Modern Drug Encyclopedia, 2nd ed., 1941, pages 319, 320, 347, 364, 365.

Segal, Gastroenterology, vol. 4, pp. 484 to 496 (167–72).

Martin, Gastroenterology, pp. 315 to 323, April 1946 (167–72).

Pharmaceutical Abstracts (of the Journal of the Am. Ph. Assoc. (1943) Sci. ed.), vol. 9, p. 130.